United States Patent
Kawale

(10) Patent No.: US 9,077,537 B2
(45) Date of Patent: Jul. 7, 2015

(54) GENERATING SECURE PRIVATE KEYS FOR USE IN A PUBLIC KEY COMMUNICATIONS ENVIRONMENT

(75) Inventor: Jaikumar N. Kawale, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1507 days.

(21) Appl. No.: 12/270,000

(22) Filed: Nov. 13, 2008

(65) Prior Publication Data

US 2010/0119061 A1    May 13, 2010

(51) Int. Cl.
  *H04L 9/00*  (2006.01)
  *H04L 9/30*  (2006.01)
  *H04L 9/08*  (2006.01)

(52) U.S. Cl.
  CPC .............. *H04L 9/302* (2013.01); *H04L 9/0866* (2013.01); *H04L 9/0891* (2013.01)

(58) Field of Classification Search
  CPC .............. H04L 9/0866; H04L 9/3231; H04L 29/06809; H04L 63/0861; G06F 21/32
  USPC ......................................................... 380/44
  See application file for complete search history.

(56) References Cited

U.S. PATENT DOCUMENTS

| | | | |
|---|---|---|---|
| 4,210,899 A | 7/1980 | Swonger et al. | |
| 4,581,760 A | 4/1986 | Schiller et al. | |
| 4,641,350 A | 2/1987 | Bunn | |
| 5,541,994 A * | 7/1996 | Tomko et al. | 380/30 |
| 5,604,801 A | 2/1997 | Dolan et al. | |
| 5,680,460 A | 10/1997 | Tomko et al. | |
| 5,995,630 A | 11/1999 | Borza | |
| 6,035,398 A | 3/2000 | Bjorn | |
| 6,076,162 A | 6/2000 | Deindl et al. | |
| 6,078,265 A | 6/2000 | Bonder et al. | |
| 6,363,485 B1 * | 3/2002 | Adams et al. | 713/186 |
| 6,367,016 B1 * | 4/2002 | Lambert et al. | 713/185 |
| 6,542,608 B2 | 4/2003 | Scheidt et al. | |
| 6,549,623 B1 | 4/2003 | Scheidt et al. | |
| 6,687,375 B1 | 2/2004 | Matyas, Jr. et al. | |
| 6,836,554 B1 * | 12/2004 | Bolle et al. | 382/116 |
| 6,928,163 B1 | 8/2005 | Matyas, Jr. et al. | |
| 6,940,976 B1 | 9/2005 | Matyas, Jr. et al. | |
| 7,079,653 B2 | 7/2006 | Scheidt et al. | |
| 7,111,173 B1 | 9/2006 | Scheidt | |
| 2002/0116508 A1 * | 8/2002 | Khan et al. | 709/229 |
| 2003/0219121 A1 * | 11/2003 | van Someren | 380/44 |
| 2010/0052852 A1 * | 3/2010 | Mohanty | 340/5.83 |
| 2010/0312763 A1 * | 12/2010 | Peirce | 707/723 |

FOREIGN PATENT DOCUMENTS

WO    WO2008030184 A1    3/2008

* cited by examiner

*Primary Examiner* — Esther B Henderson
(74) *Attorney, Agent, or Firm* — Ronald A. Kaschak; Kevin P. Radigan, Esq.; Heslin Rothenberg Farley & Mesiti P.C.

(57) ABSTRACT

A private key is generated for use in a public key communications environment, and the private key includes a partial private key and processed biometric data. The partial private key is known to the user, but the processed biometric data is not. The processed biometric data is generated on the fly and is not provided to the user. This enables a more secure and robust private key to be created and used in encryption/decryption.

19 Claims, 12 Drawing Sheets

GENERATING SECURE PRIVATE KEYS FOR USE IN A PUBLIC KEY COMMUNICATIONS ENVIRONMENT

TECHNICAL FIELD

This invention relates, in general, to data security, and in particular, to enhancing data security in a public key communications environment by providing and using private keys that are more secure and offer additional protection.

BACKGROUND OF THE INVENTION

Information (e.g., data, messages, etc.) that is sent from a sender to a receiver in a communications environment is often encrypted to camouflage the plain text of the information. When the receiver receives the encrypted information, the receiver decrypts the information to obtain the plain text. In one example, mathematics are used in the encryption/decryption processes, and this is referred to as cryptography. In cryptography, at least one key is used to encrypt/decrypt the information. For instance, in public key cryptography, a pair of keys is used, including a public key and a private key. The public key is public, but the private key is secret. The private key is not transmitted or shared with anyone but the user. One example of a public key system is described in U.S. Pat. No. 5,604,801 entitled "Public Key Data Communications System Under Control of a Portable Security Device," issued Feb. 18, 1997, which is hereby incorporated herein by reference in its entirety.

In public key communications environments, such as a public key cryptography system (PKCS), if a user's private key is lost or stolen, the new possessor of the key can use it to extract information sent to the user using the user's public key. Similarly, the possessor of the key can send information to others pretending that the true owner of the private key has sent the information. This can continue until a new private/public key pair is generated by a key generating authority. The time required, however, in revoking the old keys may be sufficient for intruders to perform drastic offenses.

Private keys are traditionally protected using passwords. However, password usage is not a safe approach as they themselves may get lost. Another approach already in use is the usage of fingerprints as private keys. However, this makes the revocation of keys less feasible as the fingerprints are mapped to private keys using fingerprint key generating software. In such cases, the fingerprints technique may need to be changed whenever the key is lost.

SUMMARY OF THE INVENTION

Based on the foregoing, a need exists for an improved technique to protect private keys, and thus, the security of data. In one example, a need exists for enhanced private keys and for improved techniques for generating and using the enhanced private keys.

The shortcomings of the prior art are overcome and additional advantages are provided through the provision of a method for facilitating protection of information in a public key communications environment. The method includes, for instance, obtaining a partial private key of a user of the public key communications environment; obtaining processed biometric data based on biometric data of the user, wherein the processed biometric data is unknown to the user; and combining the partial private key and the processed biometric data to form a private key for use in encryption or decryption in the public key communications environment.

Systems and program products relating to one or more aspects of the present invention are also described and claimed herein. Further, services relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Users of a public key communications system are provided two keys, a public key and a private key. The public key of a user is available to anyone, whereas the private key is known only to the user. These keys are used for encryption and decryption of information. If the user's private key is used to encrypt information, then the public key is used to decrypt the information, and vice versa. These keys are mathematically linked together and are generally distributed by a key generating authority to the user. Whenever a user feels that it's private key is compromised, the user requests generation of a new private and public key pair. This demands the revocation of a user's digital certificate as it contains the public key. However, until the time this process completes, the user's private key can be used to extract information sent using the user's public key. Similarly, the user's private key can be used to send information to others. This problem is addressed by one or more aspects of the present invention.

In accordance with an aspect of the present invention, a user's private key is not usable to send or receive messages even if the user's private key is known. This is because only a portion of the private key is known. An enhanced private key is generated and used, which includes a combination of a partial private key (known) and biometric data (unknown). The partial private key and biometric data of the user are used to encrypt information at the sender's end. Whenever a sender is to send a digitally signed document, the sender generates a digital signature using the partial private key distributed by the key generating authority to the user and using the biometric data. The combination of partial private key and processed biometric data forms the actual private key to be used in the system. At the receiver's end, the user's public key is used to decrypt the received information. With such a system in place, authentication and confidentiality of information traveling in a public key communications environment can be greatly enhanced, and key generating authorities can easily revoke keys on demand.

The biometric data includes any type of biometric data that identifies a user, including, but not limited to, eye recognition, fingerprint data, etc. In the examples described herein, the biometric data is fingerprint data; however, other types of biometric data may be used without departing from the spirit of the present invention.

Figure 1:
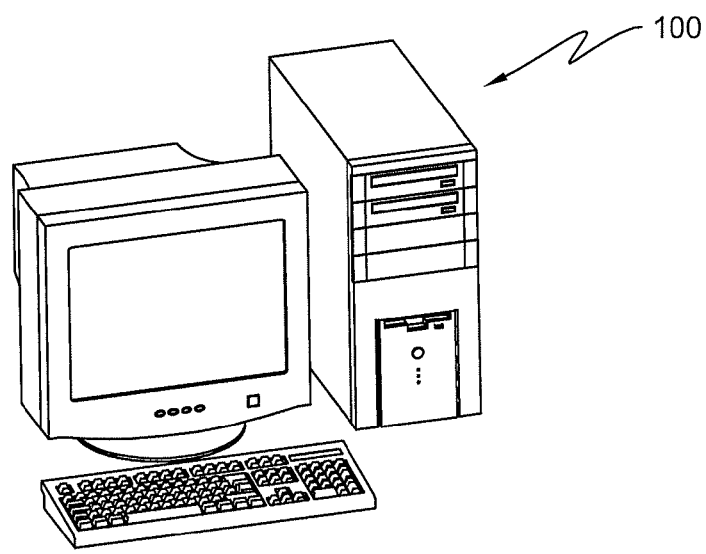
FIG. 1 depicts one example of a computer used to execute one or more processes of the present invention.

In the public key communications environment, various processes are used to protect the data, including a key generation process, an encryption process and a decryption process. The key generation process is performed by a key generating authority, which can be the sender of a message, an intermediate agreed upon authority or any third party that supplies public keys of users to others in the form of digital certificates, as examples. Each process is capable of being executed on many different types of processing units, and each process may be run on a different processing unit or the same processing unit as another of the processes. One example of a processing unit to execute one or more of the processes is depicted in FIG. 1. As an example, the processing unit is a computer 100, which may be, for instance, a personal computer, a laptop, a mainframe or any other type of computer. In one or more examples, the processing unit is a commercially available product offered by International Business Machines Corporation. Although examples are provided herein, any type of computer or other processing unit may be used.

Figure 2:
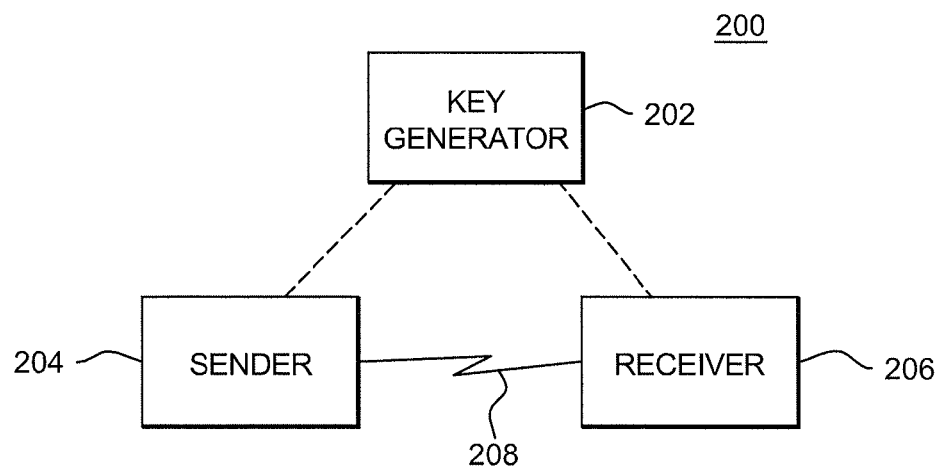
FIG. 2 depicts one example of a communications environment having a sender and a receiver capable of communicating in accordance with an aspect of the present invention.

In one particular example, with reference to FIG. 2, a public key communications system 200 includes a key generator 202 used to generate the private/public key pairs, which is executed on one processing unit; and a sender 204 sending information from another processing unit to a receiver 206 on yet another processing unit. Sender 204 is coupled to receiver 206 via a connection 208. The connection can be any type of connection including, for instance, a local area network, a wide area network, a wire, a token ring, a bus, etc. Likewise, key generator 202 is coupled to one or more of sender 204 and receiver 206 (receiver 206 may send its own information, and therefore, require a private/public key pair) via one or more connections, such as those described above. Although various connections and configurations are described herein, these are only examples. Many other types of connections and configurations can be provided without departing from the spirit of the present invention.

In one example, a user on sender 204 receives a partial private key from key generator 202, encrypts a message using the partial private key and the user's fingerprint data, and sends the message to receiver 206. Receiver 206 uses a public key corresponding to the private key, which is generated by key generator 202, to decrypt the message. The public key is typically published for access by the receiver. Further details regarding key generation, encryption and decryption are provided below.

Figure 3:
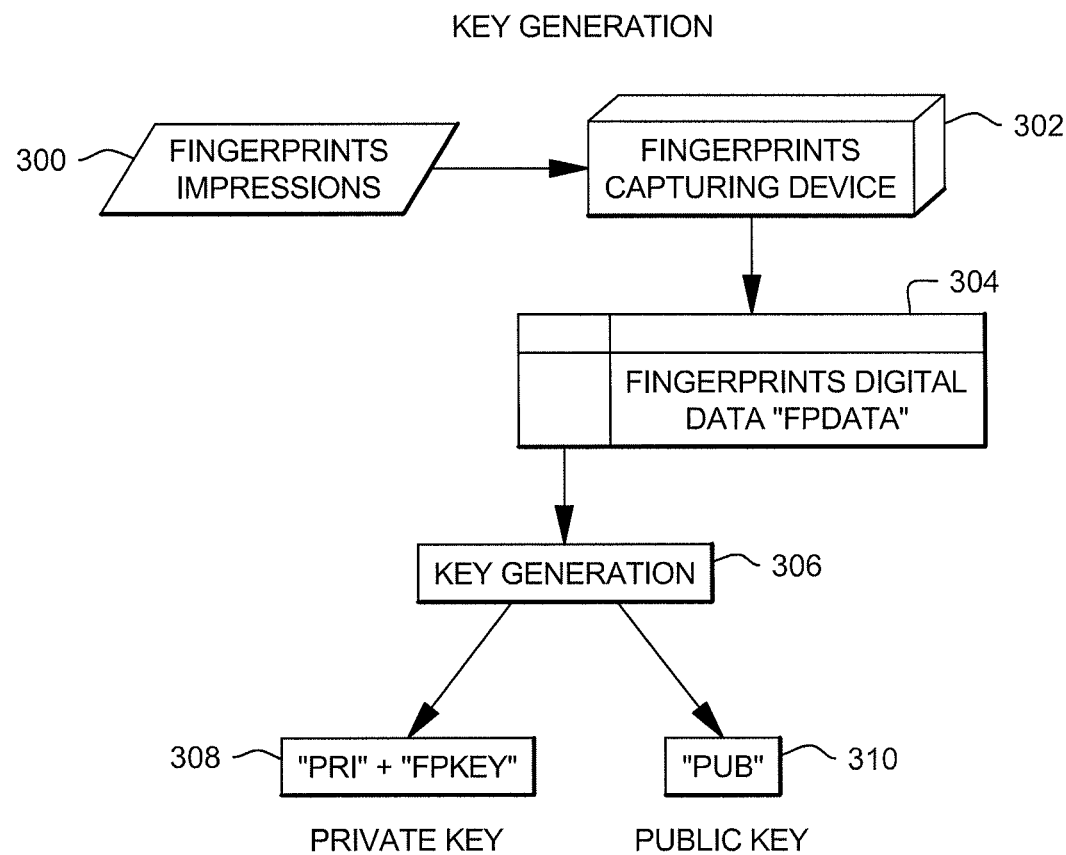
FIG. 3 depicts one example of a block overview of a key generation process used in accordance with an aspect of the present invention.

One embodiment of an overview of key generation is described with reference to FIG. 3. A user for which a private/public key pair is to be generated presses a finger or a combination of fingers 300 on a fingerprints capturing device 302. The device captures the fingerprints and generates digital fingerprint data, referred to as FPDATA. Fingerprints capturing device 302 is, for instance, a portable device which can be connected to a computer via, for instance, a USB port. Particular commercially available examples of fingerprint capturing devices include an FPR-620 fingerprint reader offered by Miaxis Biometrics Co., Ltd., Hangzhou, P. R. China; and a Smart Finger offered by Fortuna Impex PTE Ltd., Kolkata, India. Although these examples are provided, many other examples are also possible.

The fingerprints digital data, which is output from the fingerprints capturing device, is input to a computer (or other processing unit) executing a key generation process 306. Key generation process 306 takes the fingerprint data and processes it to provide a fingerprint key, FPKEY, as described below. The fingerprint key and a partial private key make up a private key 308. Private key 308 and a public key 310, also generated by key generation logic 306, are used for encryption/decryption.

The fingerprint data, FPDATA, is used in the key generation process so that the private key and public key are mathematically linked together. Although they are linked together, the private key cannot be generated from the public key. The FPKEY part of the private key is not sent to the user or stored in any storage, in this embodiment. Instead, it is generated, when needed, from the user's fingerprint data, FPDATA. The fingerprint key may be deleted, in response to generation of the partial private key and the public key, if desired by the user. In a further embodiment, the FPKEY is maintained and may be used in the future for key generation.

Figure 4A:
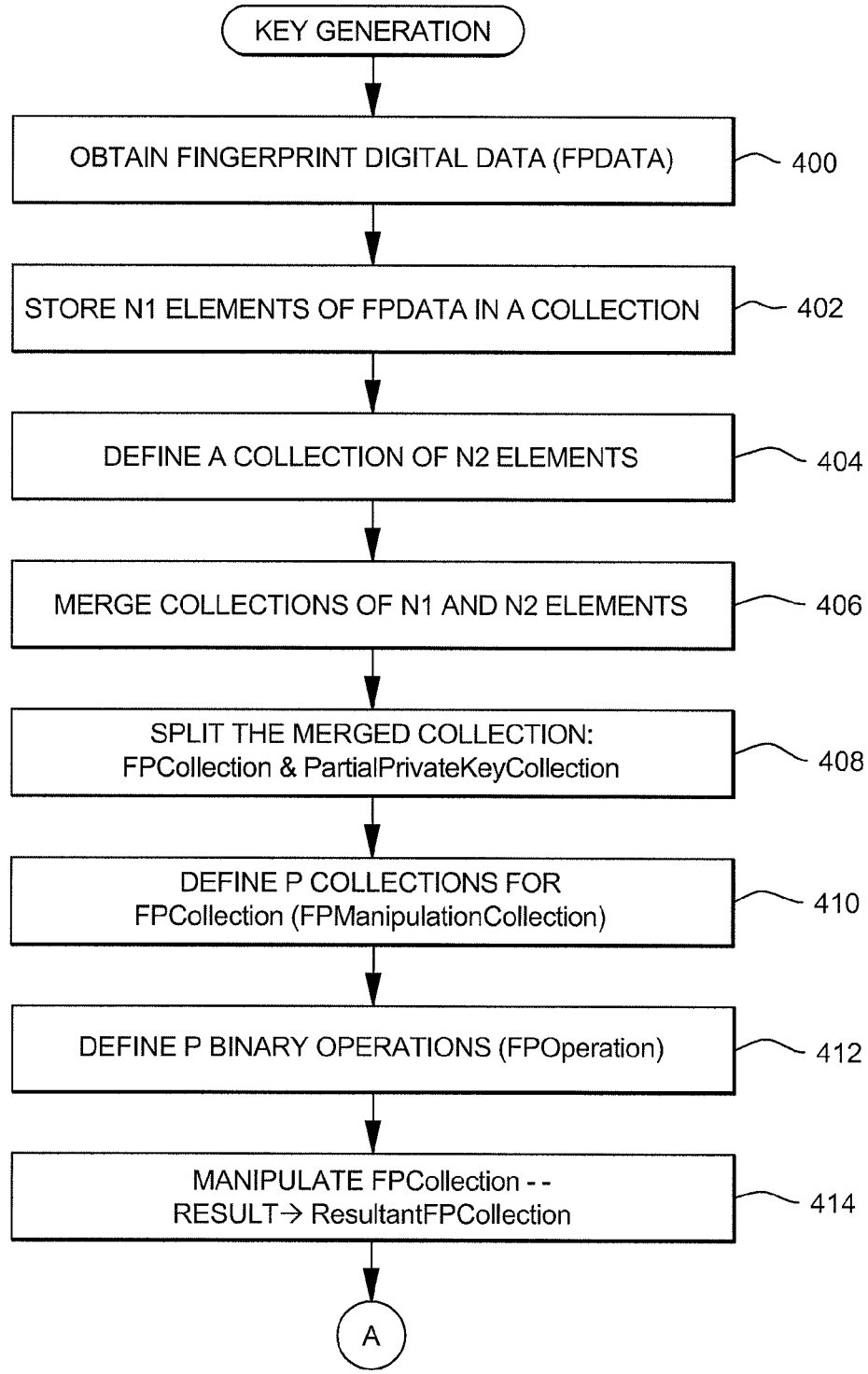
FIGS. 4A-4C depict one embodiment of the logic associated with generating keys, in accordance with an aspect of the present invention.

Further details regarding key generation are described with reference to FIGS. 4A-4C. Referring initially to FIG. 4A, a fingerprint digital data, FPDATA, is obtained from a fingerprints capturing device, STEP 400. In one example, the design of the fingerprints capturing device is flexible enough to allow generation of any desired form of digital data, e.g., binary data, ASCII characters, unicode characters, etc. Each entry/item in FPDATA is referred to as an element. Assume N1 number of elements is generated as FPDATA. These elements are stored in a collection, STEP 402.

Thereafter, a collection of a number (N2) of elements (as chosen by the implementer, such as random numbers or any other strategies) is defined, STEP 404. N2 is selected by the key generation logic or predefined based on the desired robustness of the key. The sum N1+N2 is equal to N, which is the number of elements in the public key.

Thereafter, the collections obtained in STEPS 402 and 404 are merged to provide a consolidated collection of N elements, STEP 406. In one example, the first to N1th elements are from the first collection, and the N1th+1 to Nth elements are from the second collection.

The N elements of the consolidated collection are then split into two parts using a value S, such that the two parts include N/S and N−(N/S) elements, respectively, STEP 408. The selection of which element is to be included in which part can be decided based on a pre-defined strategy. For example, one pattern that can be used is that the first N/S even numbers are to be included in the first part and the remaining are to be included in the second part. Another pattern that can be used is a set, such as {3, 4, 2, 5, 6, 1} to populate the first part. The process starts with the first element as a base position and selects the element at the third position from the base position and that is the first element. Then, the base position changes to point to the last pickup location, i.e., the third position, and one looks for the fourth position from there. The process continues in the same manner to pick elements at second, fifth, sixth and first elements from the latest base location. The pattern continues until N/S elements are populated in the first part. Once the first part occupies N/S elements, the second part is populated with the remaining elements. The two parts formed are: FPCollection, which includes N/S elements; and PartialPrivateKeyCollection, which includes N−(N/S) elements.

Moreover, a P number of collections, each of N/S size, are defined for FPCollection, STEP 410. These collections include elements to manipulate the data in FPCollection. The collections include, for instance:

---

FPManipulationCollection_1 contains {element_1, element_2 . . . element_N/S}
FPManipulationCollection_2 contains {element 1, element_2 . . . element_N/S}
. . .
FPManipulationCollection_P contains {element_1, element_2 . . . element_N/S}

---

Further, a P number of binary operations (or other operations) are defined in the collection for performing manipulations on FPCollection, STEP 412. FPOperation includes, for instance, {operation_1, operation_2 . . . operation_P}.

The FPCollection is manipulated by applying the operations defined in FPOperation on FPCollection and FPManipulationCollection_x. One example of the manipulation is described with reference to FIG. 4C. A ResultantFPCollection is initialized with FPCollection, STEP 420. Thereafter, iteration through a loop begins and an index is set to one, STEP 422. In this example, the loop iterates for index=1 to P times. Within the loop, ResultantFPCollection= ResultantFPCollection FPOperation [index] FPManipulationCollection_[index], STEP 424. That is, the specified operation, FPOperation, is applied to resultant FPCollection and the particular FPManipulationCollection.

A determination is made as to whether the iteration is complete, INQUIRY 426. That is, is the index equal to P, in this example. If not, then the index is incremented by, for instance, one, STEP 428, and processing continues with STEP 424. Otherwise, the manipulation is complete. Upon completion, ResultantFPCollection includes final data obtained by performing the defined operations on the defined fingerprints manipulation collections. This is FPKEY.

Figure 4B:
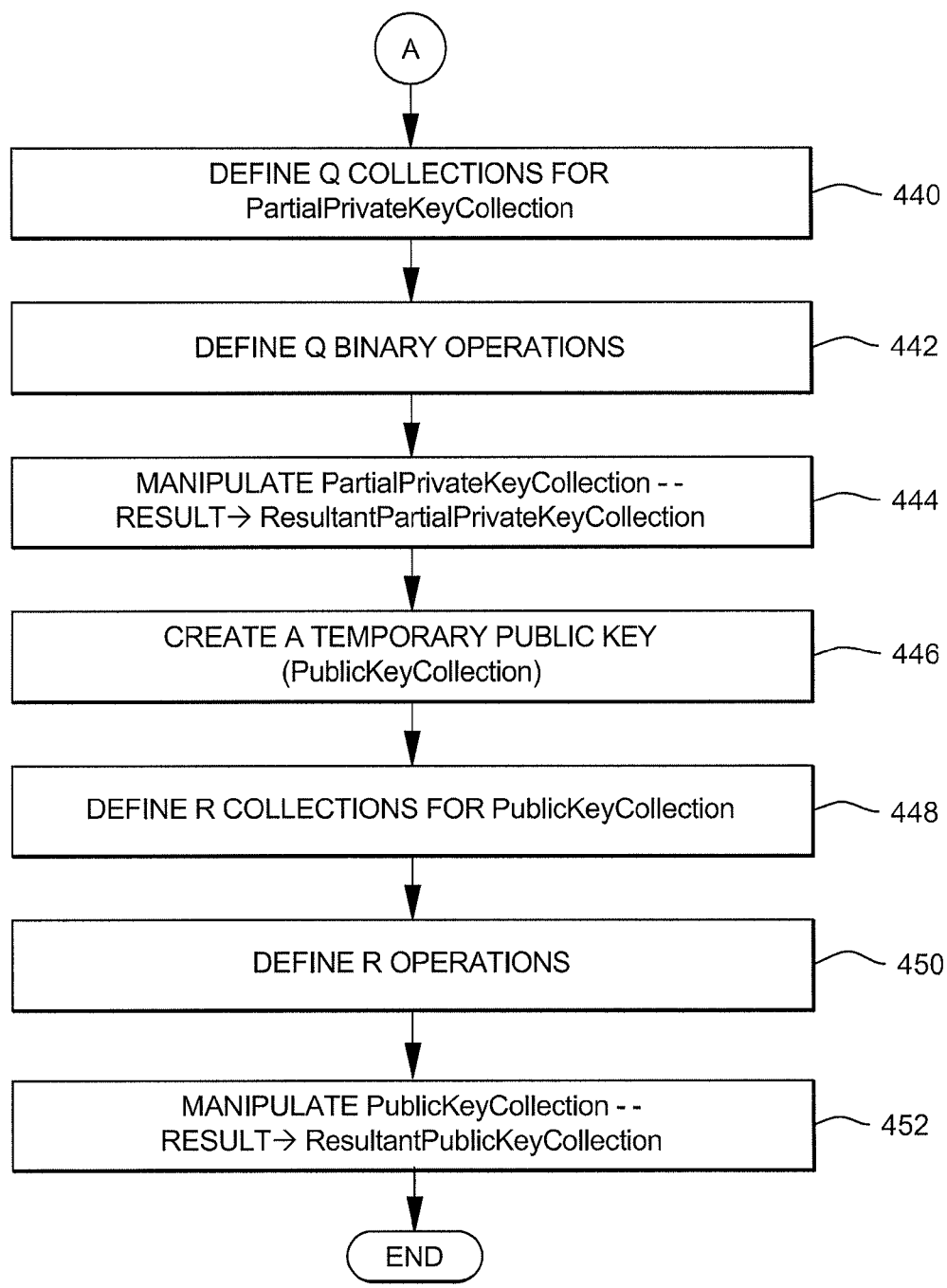
Figure 4C:
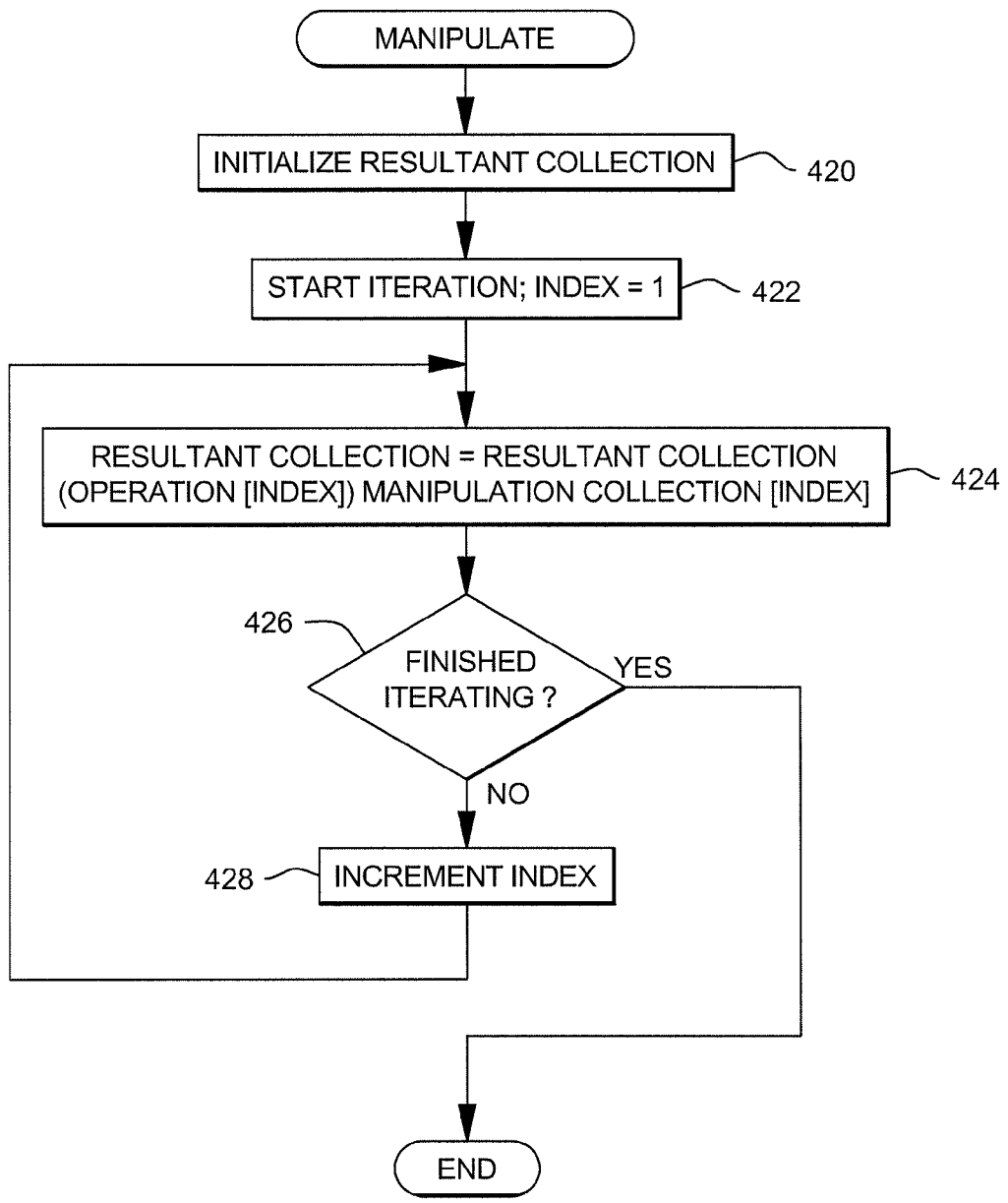

Key generation now continues with FIG. 4B. Subsequent to performing the manipulations, Q number of collections, each of N−N/S size, are defined for PartialPrivateKeyCollection, STEP 440. These collections include elements that manipulate the data in PartialPrivateKeyCollection. They include, for instance:

---

PartialPrivateKeyManipulationCollection_1 contains {element_1, element_2 . . . element_(N-N/S)}
PartialPrivateKeyManipulationCollection_2 contains {element_1,

---

-continued

--- element_2 . . . element_(N-N/S)}
PartialPrivateKeyManipulationCollection_Q contains {element_1, element_2 . . . element_(N-N/S)}

---

Further, Q number of binary (or other) operations are defined in a collection for performing manipulations on PartialPrivateKeyCollection, STEP 442. PartialPrivateKeyOperation includes {operation_1, operation_2 . . . operation_Q}. The operation chosen should be reversible, in one example. For example, operations like +, −, * are reversible as the previous state can be obtained by performing −, +, / operations, respectively.

The PartialPrivateKeyCollection is manipulated by applying the operations defined in PartialPrivateKeyOperation on PartialPrivateKeyCollection and PartialPrivateKeyManipulationCollection_X, STEP 444. This manipulation is similar to that described with reference to FIG. 4C. For example, a ResultantPartialPrivateKeyCollection is initialized with PartialPrivateKeyCollection; a loop is iterated for index=1 to Q times; and within the loop, ResultantPartialPrivateKeyCollection=ResultantPartialPrivateKeyCollection PartialPrivateKeyoperation[index] PartialPrivateKeyManipulationCollection_[index]. Upon completion, ResultantPartialPrivateKeyCollection includes the final data obtained by performing the defined operation on the defined PartialPrivateKeyManipulationCollection. The obtained ResultantPartialPrivateKeyCollection includes N−(N/S) elements and is a PartialPrivateKey (PRI) of the user.

The combination of ResultantFPCollection and ResultantPartialPrivateKeyCollection is a private key that can be used to encrypt/decrypt data. The above combination is to be mathematically linked to a key called a public key, which can be distributed to others. Others should not be able to view ResultantFPCollection, ResultantPartialPrivateKeyCollection or a combination of both.

Referring to FIG. 4B, a temporary public key, PublicKeyCollection, is created by merging ResultantFPCollection and ResultantPartialPrivateKeyCollection, STEP 446. Thus, PublicKeyCollection includes [N/S+N−(N/S)=] N elements. In one example, the merge is performed such that the first N/S elements in PublicKeyCollection are from ResultantFPCollection and the remaining N−(N/S) elements are from ResultantPartialPrivateKeyCollection.

R number of collections are defined for PublicKeyCollection, each of N size, STEP 448. These collections contain elements to manipulate the data in PublicKeyCollection, such as, for instance:

---

PublicKeyManipulationCollection_1 contains {element_1, element_2 . . . element_N}
PublicKeyManipulationCollection_2 contains {element_1, element_2 . . . element_N}
. . .
PublicKeyManipulationCollection_R contains {element_1, element_2 . . . element_N}

---

Further, R number of binary (or other) operations are defined in a collection for performing manipulations on PublicKeyCollection, STEP 450. PublicKeyCollectionOperation contains {operation_1, operation_2 . . . operation_R}. The operations chosen are to be reversible, in one example. For example operations like +, −, * are reversible as the previous state can be obtained by performing −, +, / operations, respectively.

The PublicKeyCollection is manipulated by applying the operations defined in PublicKeyCollectionOperation on PublicKeyCollection and PublicKeyManipulationCollection_x. One example of this manipulation is as follows: initialize ResultantPublicKeyCollection with PublicKeyCollection; iterate through a loop for index=1 to R times; while in the loop, ResultantPublicKeyCollection=ResultantPublicKeyCollection PublicKeyOperation[index] PublicKeyManipulationCollection_[index]. Upon completion, ResultantPublicKeyCollection includes final data obtained by performing the defined operations on the defined public key manipulation collections. The obtained ResultantPublicKeyCollection including N elements is the public key of the user.

In one example, the selection/definition of the variables/collections values used should be such that from the public key it is practically impossible to generate the partial private key or processed fingerprints data or a combination of both.

Figure 5:
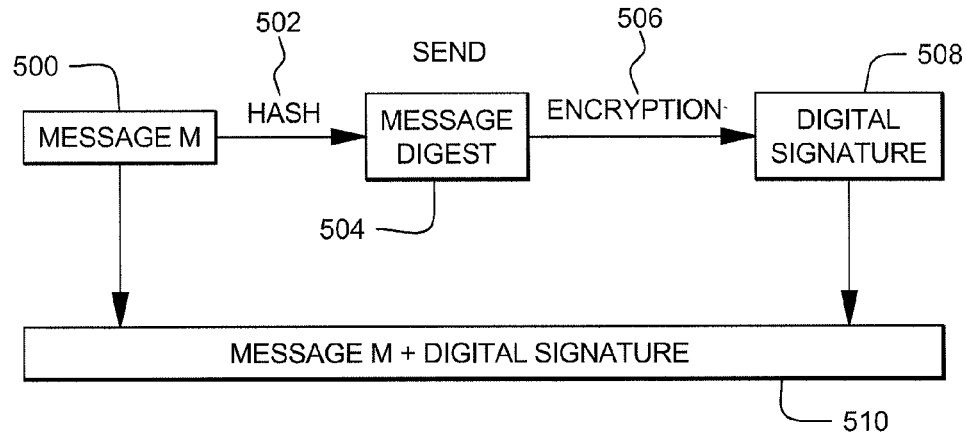
FIG. 5 depicts one example of a block overview of a send process, in accordance with an aspect of the present invention.

The partial private key generated using the key generation process and the processed fingerprints data are used, in one example, for encryption of information sent from a sender to a receiver. For instance, as depicted in FIG. 5, a sender sends a message, Message M, 500. Message M is input to a hash technique 502 to generate a message digest 504. In one example, the hash technique is a standard one-way hash function that breaks down the message to a message digest. Examples of hash techniques that can be used include Secure Hash Algorithm (SHA-1) and Message Digest 5 (MD5), to name a couple. Many other hash functions can also be used. These techniques are used after processing the message in accordance to the inputs required for the selected hash technique (e.g., provide correct size of input). In one example, the same hash technique selected for the sending is also used at the receiving end.

The message digest is input to an encryption process 506, which uses the user's partial private key and fingerprint data to obtain a digital signature 508. Digital signature 508 and Message M 500 are sent together 510 to the receiver.

Figure 6:
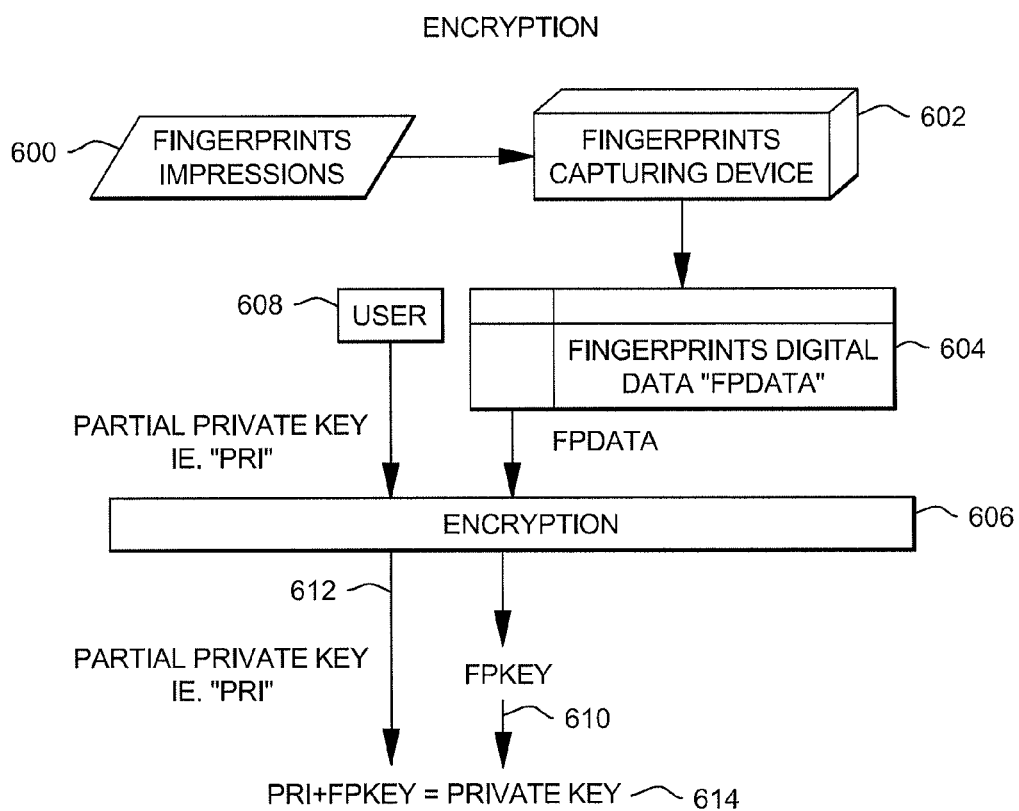
FIG. 6 depicts one example of a block overview of an encryption process used in accordance with an aspect of the present invention.

An overview of an encryption process used to encrypt the message is described with reference to FIG. 6. As with the key generation operation, the impressions of a user's fingerprints 600 are input to a fingerprint capturing device 602. The output of the fingerprint capturing device is digital fingerprint data 604, which is input to an encryption process 606. Also input to the encryption process is a user's partial private key 608 generated by the key generation process. The encryption technique takes the FPDATA and creates a fingerprint key, FPKEY, 610, as described herein. Thereafter, fingerprint key 610 is combined with the partial private key 612 to provide a private key 614 used in encryption.

Figure 7:
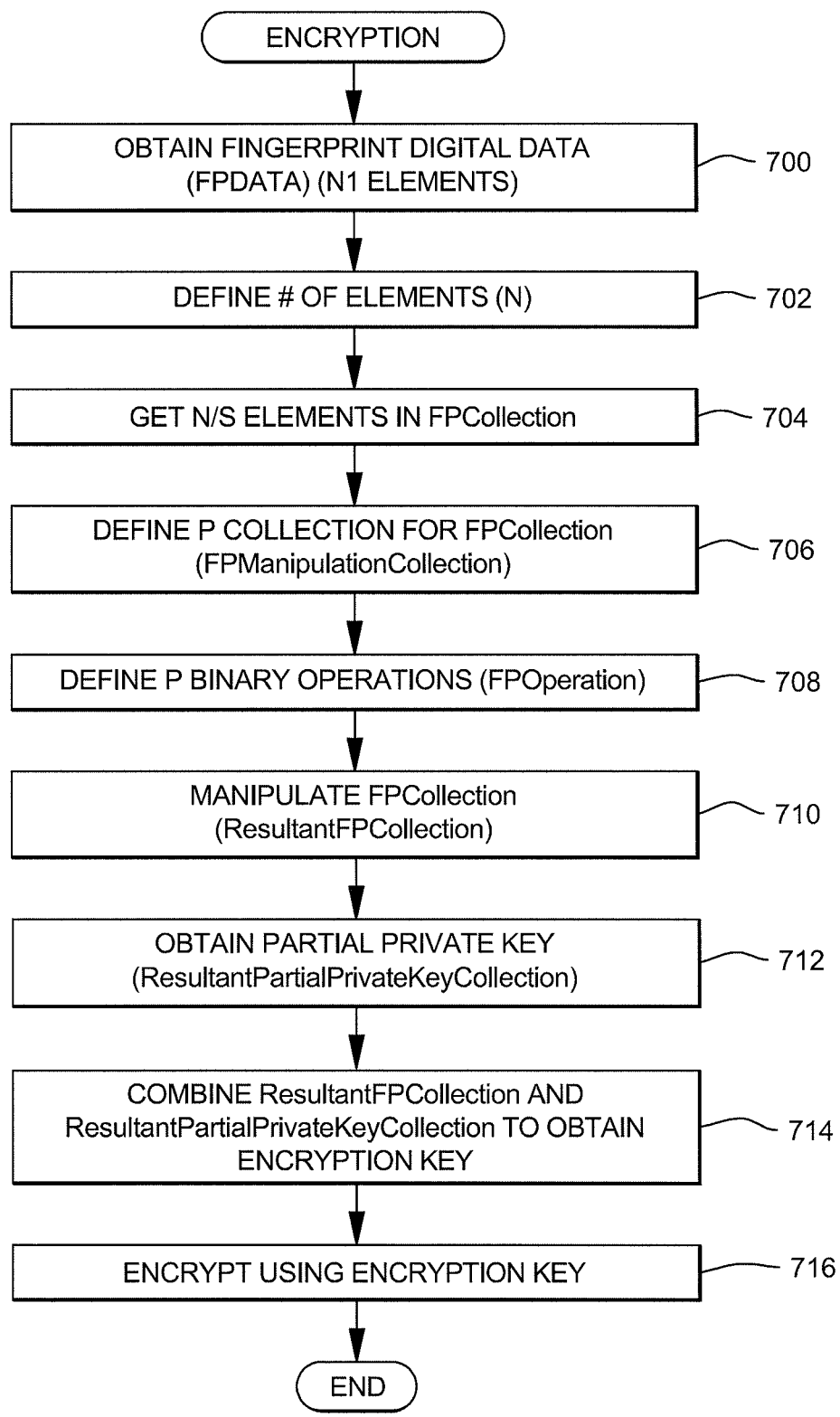
FIG. 7 depicts one embodiment of the logic associated with an encryption process, in accordance with an aspect of the present invention.

Further details regarding encryption are described with reference to FIG. 7. Initially, the fingerprints digital data, FPDATA, is obtained from the fingerprints capturing device, STEP 700. In this example, FPDATA includes N1 elements. Further, the N2 elements defined in the key generation process are used to provide N1+N2=N elements, where N is the number of elements in the public key, STEP 702.

From the N elements, N/S elements are obtained in a collection, FPCollection, using, for instance, the same strategy used in the key generation process. The value S is also defined in the key generation process.

Additionally, a P number of collections for FPCollection are defined, in which each collection is N/S size, STEP 706. These collections are the same as in the key generation process and contain elements to manipulate the data in FPCollection. For example:

FPManipulationCollection_1 contains {element_1, element_2 ... element_(N/S)}
FPManipulationCollection_2 contains {element_1, element_2 ... element_(N/S)}
...
FPManipulationCollection_P contains {element_1, element_2 ... element_(N/S)}

Also, a P number of binary (or other) operations are the same as in the key generation process and are defined in a collection for performing manipulations on FPCollection, STEP 708. In one example, FPOperation includes {operation_1, operation_2 ... operation_P}.

The FPCollection is manipulated by applying the operations defined in FPOperation on FPCollection and FPManipulationCollection_x, STEP 710. In one example, this manipulation includes: initializing Resultant FPCollection with FPCollection; iterating through a loop for index=1 to P times; while in the loop, ResultantFPCollection= ResultantFPCollection FPOperation [index] FPManipulationCollection_[index]. Upon completion, ResultantFPCollection includes the final data obtained by performing the defined operations on the defined fingerprints manipulation collections.

In addition to the above, the user's partial private key, ResultantPartialPrivateKeyCollection, is obtained from the user, STEP 712. This includes N−(N/S) elements.

The ResultantFPCollection and ResultantPartialPrivateKeyCollection are combined to obtain a private key used for encryption (a.k.a., encryption key), STEP 714. In one example, the merge is performed such that the first N/S elements in the encryption key are from ResultantFPCollection and the remaining N−(N/S) elements are from ResultantPartialPrivateKeyCollection. The encryption key is then used to encrypt the message, STEP 716.

Figure 8:
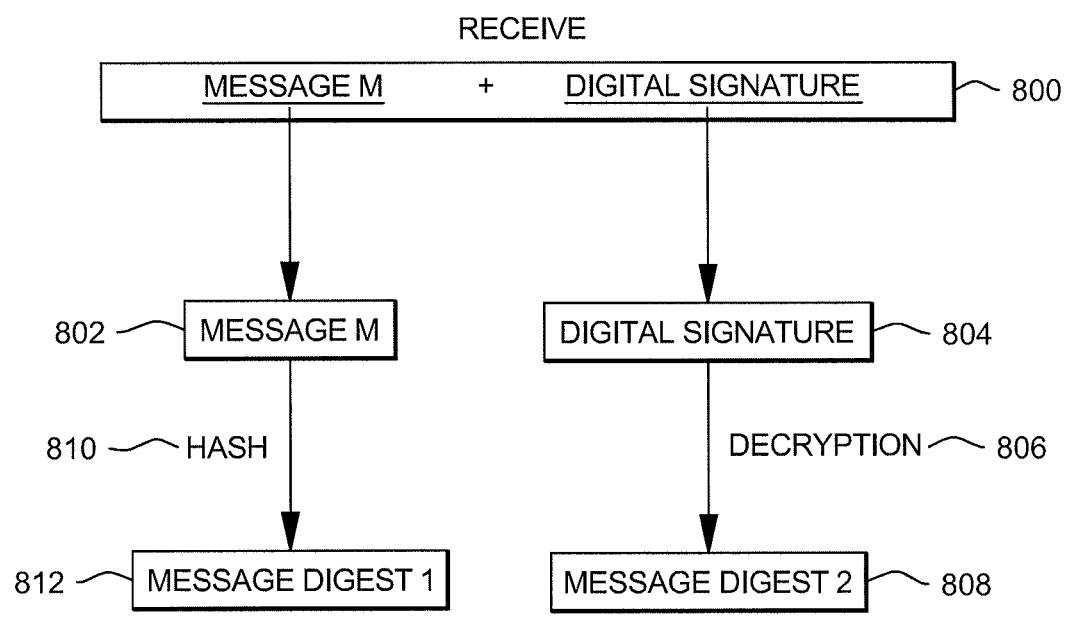
FIG. 8 depicts one embodiment of a block overview of a receive process, in accordance with an aspect of the present invention.

When the receiver receives the encrypted message, with reference to FIG. 8, the contents of the encrypted message 800 (e.g., Message M plus digital signature) are separated into Message M 802 and digital signature 804. A decryption process 806 uses the public key of the sender to decrypt the digital signature to obtain message digest 2 (808). Further, hash technique 810 (the same that was used at the sender's end) is used to obtain message digest 1 (812). If message digest 2 and message digest 1 are equal, Message M is intact indicating that the sender is the real sender of the message.

Figure 9:
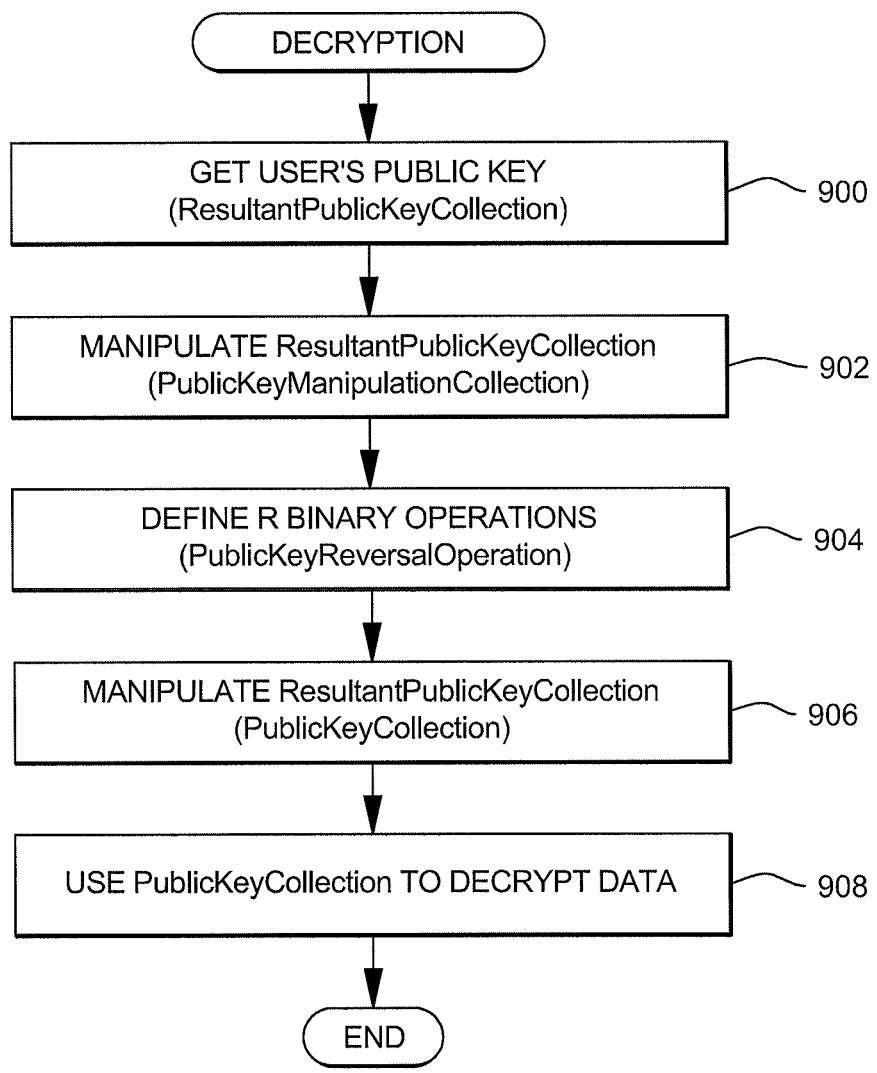
FIG. 9 depicts one embodiment of the logic associated with a decryption process, in accordance with an aspect of the present invention.

Further details regarding decryption are described with reference to FIG. 9. Initially, the user's public key, ResultantPublicKeyCollection, is obtained, STEP 900. It includes N elements. With the obtained public key, the decryption key is determined by reversing the operations performed in the key generation process, since the decryption key is mathematically linked to the encryption key. This process is described below.

The manipulation collections defined for PublicKeyCollection are used, STEP 902. They include the R number of collections, each of size N, used in the key generation process to obtain manipulated data in ResultantPublicKeyCollection. That is:

PublicKeyManipulationCollection_1 contains {element_1, element_2 ... element_N}
PublicKeyManipulationCollection_2 contains {element_1, element_2 ... element_N}
...
PublicKeyManipulationCollection_R contains {element_1, element_2 ... element_N}

These collections are used to revert back to the previous state.

Additionally, a reversal operations collection is created corresponding to the operations collection used in key generation. For instance, R number of binary (or other) operations are defined in a collection for performing reversal of manipulations of ResultantPublicKeyCollection, STEP 904. For example, PublicKeyReversalOperation contains {operation_1, operation_2 . . . operation_R}. These operations are reversal operations to the operations defined in the key generation process for public key manipulation. Therefore, an addition operation is used where subtraction was used in the key generation process. Similarly, division is used where multiplication was used, etc.

The ResultantPublicKeyCollection is manipulated by applying the above reversal operations defined in PublicKeyReversalOperation on ResultantPublicKeyCollection and PublicKeyManipulationCollection_x, STEP 906. In one example, the PublicKeyCollection is initialized with the ResultantPublicKeyCollection; a loop is iterated for index=1 to R times; within the loop, PublicKeyCollection= PublicKeyCollection PublicKeyReversalOperation[index] PublicKeyManipulationCollection_[index]. Upon completion, PublicKeyCollection includes the final data obtained by performing the defined reversal operations on the defined public key manipulation collections. The obtained PublicKeyCollection is then used to decrypt the message or other information, STEP 908.

Described in detail above is one example of generating a private key/public key pair to be used to encrypt/decrypt information. One particular example of a cryptography system that can use one or more aspects of the present invention is RSA. In accordance with an aspect of the present invention, the RSA technique is extended to accomplish cryptography in a public key data communications system using the combination of partial private key and fingerprint data. This extension is described subsequent to an introduction of RSA.

In RSA, Message M is represented as an integer between 0 and n−1 (e.g., by breaking a long message into a series of blocks and then representing each block as an integer). Ciphertext C is an integer between 0 and n−1.

1.1 Encryption Process:

Ciphertext $C = (M \text{ power } e) \mod n$

Where, n=p.1 where p and 1 are large secret prime numbers and $e.d = 1 (\mod (p-1).(q-1))$ 1.2 Decryption Process:

A secret number d is used as a power, such as for decrypting the Ciphertext C.

$M = (C \text{ power } d) \mod n$

Hence,

Private Key of User is the set {d,n}  (I)

Public Key of that user is the set {e,n}

The security of the system depends on how difficult it is to factor the published divisor n.

1.3 How to compute keys:

i. Find n such that n=p.q

Where, p and q are large random prime numbers.

Although n is public, the factors p and q will be effectively hidden from everyone else due to the enormous difficult of factoring n. This also hides the way d can be derived from e.

ii. Select the integer d to be a large, random integer which is relatively prime to (p−1).(q−1).

That is, check that d satisfies:

$\gcd(d; (p-1).(q-1)) = 1$ (gcd means greatest common divisor).

iii. The integer e is finally computed from p; q, and d to be the multiplicative inverse of d, modulo (p−1).(q−1).

Thus, $e.d = 1 (\mod (p-1).(q-1))$.

Extended RSA (ExtendedRSA) is an extension to RSA, in accordance with an aspect of the present invention. In ExtendedRSA, the partial private key of a user is the set {PRI, n}, and the public key of that user is the set {e, n}.

2.1 Key Generation (KGA):

User's fingerprints data, FPDATA, is used in key generation, so that the private key and public key are mathematically linked together. The key generation process processes the FPDATA and maps this data to a number, FPKEY, such that, FPKEY<d, Where, d is the secret number used in RSA (referred from point (I)).

The key generation process generates the user's partial private key, PRI, as PRI=d−FPKEY.

2.2 Encryption Process (EA) in ExtendedRSA

The same approach as in RSA is used to encrypt data using receiver's public key. The public key {e, n} of receiver is used to encrypt data.

2.3 Decryption (DA) Process in Extended RSA

User's FPDATA is captured through the fingerprint capturing device.

FPKEY is generated from FPDATA using the same approach as used by KGA.

Sender enters sender's partial private key, PRI, to EA.

EA calculates the private key required for encryption/decryption in the following manner:

$$= PRI + FPKEY$$

$$= (d - FPKEY) + FPKEY$$

$$= d$$

The secret number d required in RSA is thus generated. Now, RSA can be processed to accomplish public key cryptography.

As described above, the RSA technique can be extended to have a public key data communications system, which uses the combination of partial private key and fingerprint data. The security of Extended RSA lies on how difficult it is to factor the public factor n in RSA and p and q; and the robustness of the technique which generates FPKEY from the user's fingerprints data, FPDATA.

In a further aspect of the present invention, a plurality of private key/public key pairs are generated or are capable of being generated for a user in an efficient manner. For instance, each pair is generated using the same fingerprint data, but different manipulations are used for one or more of the partial private key, the fingerprint data or the public key. This facilitates revocation of a key pair, and replacement of same. It also facilitates the providing of different private key/public key pairs to the user for use in various situations. In one example, each pair is generated using different manipulations.

Moreover, one or more aspects of the present invention can be provided, offered, deployed, managed, serviced, etc. by a service provider who offers to facilitate management of customer environments, including, for instance, providing security services. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer readable medium, in which the computer readable medium comprises one or more aspects of the present invention. The code in combination with the computer system is capable of performing one or more aspects of the present invention.

One example of a technique for deploying one or more aspects of the present invention on one or more processing units is described with reference to FIGS. 10A-10B. In this example, authentication logic, including one or more of the key generation process, encryption process, and decryption process, is deployed.

Figure 10A:
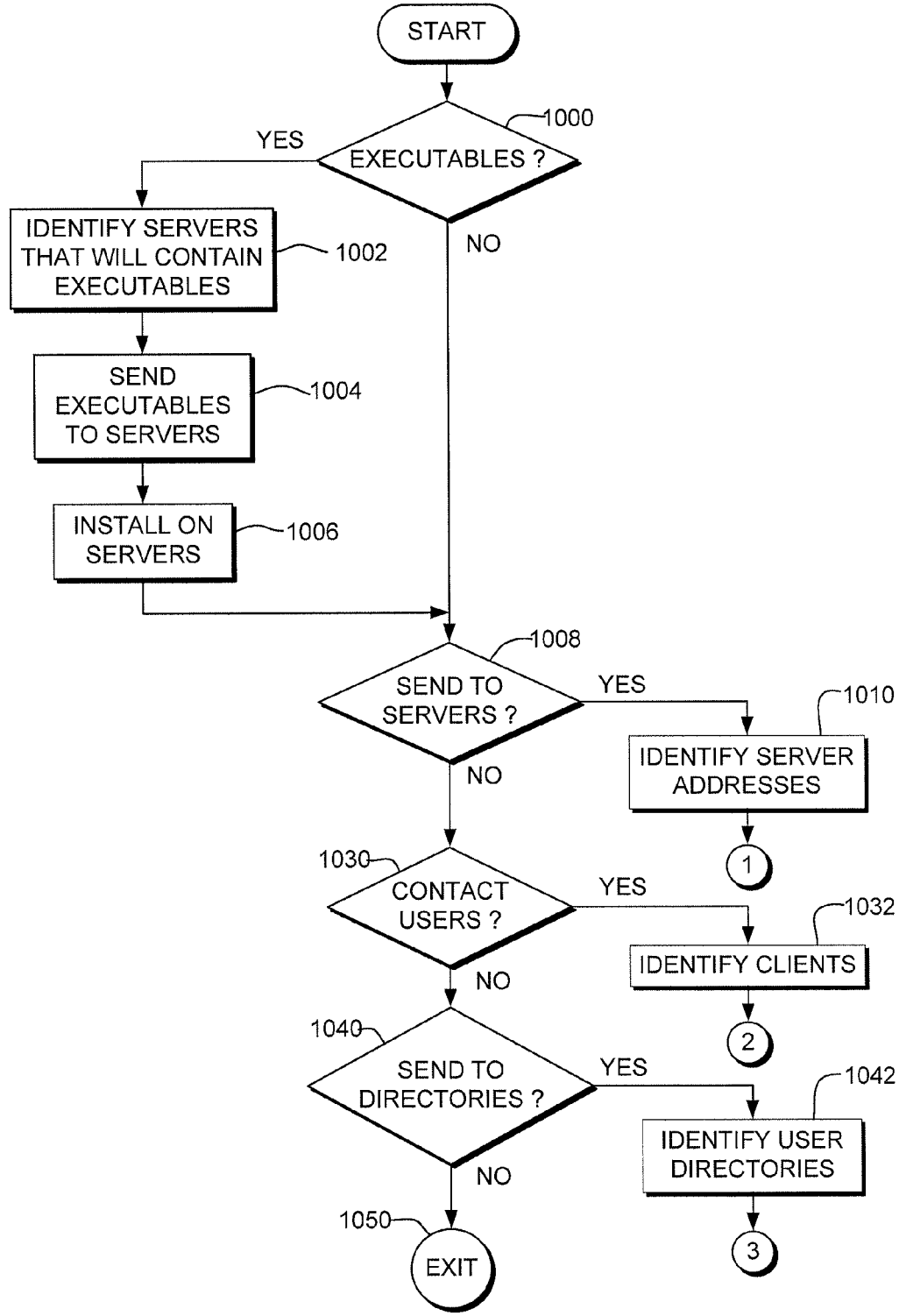
FIGS. 10A-10B depict one embodiment of the logic to deploy authentication logic on one or more processing units, in accordance with an aspect of the present invention.
Figure 10B:
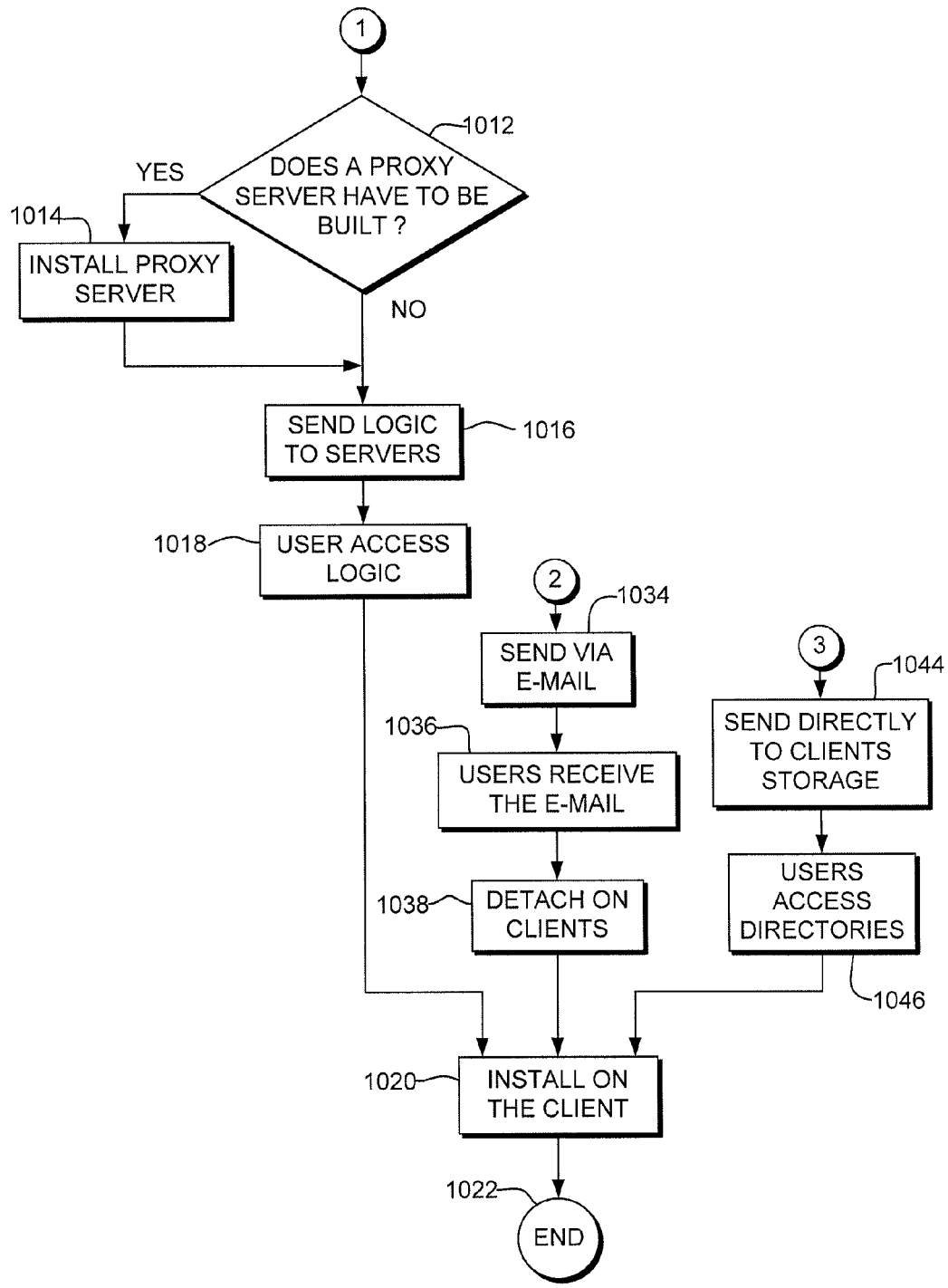

Referring to FIG. 10A, initially, a determination is made as to whether there are any programs that are to reside on one or more servers when the authentication logic is executed, INQUIRY 1000. If so, then the one or more servers to include the executables are identified, STEP 1002, and the authentication logic for the one or more servers is transferred directly to the servers' storage via, for instance, a File Transfer Protocol (FTP) or some other protocol or by copying through the use of a shared file system, STEP 1004. The logic is then installed on the servers, STEP 1006.

Thereafter, or if there are no executables, a further determination is made as to whether the authentication logic is to be deployed by having users access the logic on a server or servers, INQUIRY 1008. If the users are to access the authentication logic on servers, then the server addresses that are to store the logic are identified, STEP 1010. In one example, a determination is made as to whether a proxy server is to be built to store the authentication logic, INQUIRY 1012 (FIG. 10B). A proxy server is the server that sits between a client application, such as a web browser, and a real server. It intercepts the requests to the real server to see if it can fulfill the request itself. If not, it forwards the request to the real server. Two primary benefits of the proxy server are to improve performance and to filter requests. If a proxy server is to be built, then the proxy server is installed, STEP 1014.

Thereafter, or if a proxy server is not to be built, the authentication logic is sent to the server either via a protocol, such as file transfer protocol (FTP), or it is copied directly from the source files to the server files via file sharing, STEP 1016. As another example, a transaction is sent to the one or more servers that includes the authentication logic and the servers process the transaction, then receive and copy the logic to the servers' file systems.

After the authentication logic is stored at the servers, the users, via their client computers, access the logic on the servers and may copy at least a portion of the logic to their client computers' file systems, STEP 1018. The user then executes the program that installs the logic on the client computer, STEP 1020. In a further example, the servers automatically copy one or more aspects of the authentication logic to each client and then run the installation program for the logic at each client computer. This concludes one example of the deployment processing, STEP 1022.

Returning to INQUIRY 1008 (FIG. 10A), if the logic is not to be deployed by having users access the logic on one or more servers, then processing continues with a determination as to whether the logic is to be deployed by sending the logic to users via e-mail, INQUIRY 1030. If so, the set of users where the logic is to be deployed is identified together with the addresses of the user client computers, STEP 1032. The authentication logic is sent via e-mail to each of the user's client computers, STEP 1034 (FIG. 10B). The users receive the e-mail, STEP 1036, and detach the authentication logic from the e-mail to a directory on their client computers, STEP 1038. The user executes the program that installs the logic on the client computer, STEP 1020, and exits the process, STEP 1022.

Returning to INQUIRY 1030 (FIG. 10A), if the authentication logic is not to be deployed via e-mail, then a further determination is made as to whether the logic is to be sent directly to user directories on their client computers, STEP 1040. If so, the user directories are identified, STEP 1042. The authentication logic is directly transferred to the user's client computer directory, STEP 1044 (FIG. 10B). This can be done in several ways, such as, but not limited to, sharing of the file system directories and then copying from the sender's file system to the recipient user's file system, or alternatively, using a transfer protocol, such as file transfer protocol (FTP). The users access the directories on their client file systems in preparation for installing the authentication logic, STEP 1046. The user executes the program that installs the logic on the client computer, STEP 1020, and exits the deployment process, STEP 1022.

Returning to INQUIRY 1040 (FIG. 10A), if the logic is not to be sent directly to the users' directories, then processing ends, STEP 1050.

Although an embodiment of deploying logic is provided, many variations can be made without departing from the spirit of the present invention.

One or more aspects of the present invention can be included in an article of manufacture (e.g., one or more computer program products) having, for instance, computer readable media. The media has therein, for instance, computer readable program code means or logic (e.g., instructions, code, commands, etc.) to provide and facilitate the capabilities of the present invention. The article of manufacture can be included as a part of a computer system or sold separately.

Figure 11:
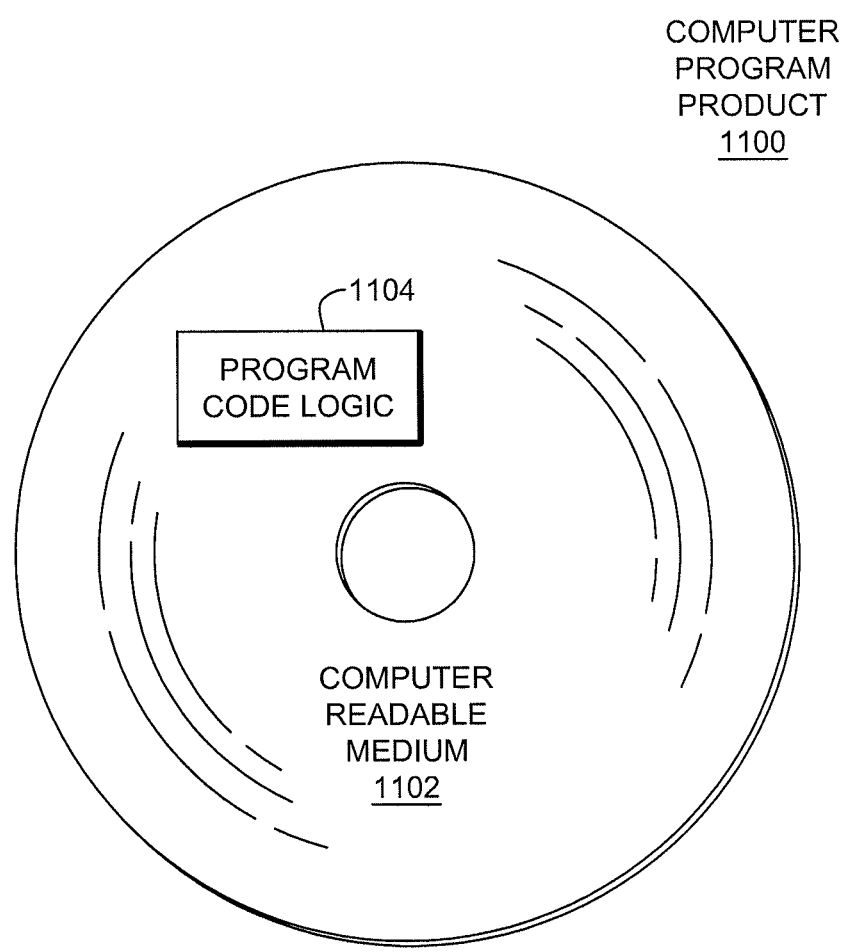
FIG. 11 depicts one embodiment of a computer program product incorporating one or more aspects of the present invention.

One example of an article of manufacture or a computer program product incorporating one or more aspects of the present invention is described with reference to FIG. 11. A computer program product 1100 includes, for instance, one or more computer usable media 1102 to store computer readable program code means or logic 1104 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided to improve data security by providing an enhanced private key. The private key is created using a partial private key and processed fingerprint data or other biometric data. The key generation process takes the processed fingerprint data and after performing manipulations on it, calculates a fingerprint key and partial private key. It also calculates a public key by performing manipulations on the fingerprint data. The public key does not contain the user's fingerprint data. It is practically impossible to generate the partial private key, processed fingerprint data or combination of both from the public key. The user's fingerprints data cannot be reproduced from the keys either individually or in combination. Thus, there is a one-way link between the fingerprints data and the keys.

Advantageously, in response to a request to revoke a key, the key generation process can be customized by changing the manipulation collections and/or operations. New partial private keys and public keys can be generated and distributed.

Summarily, the following advantages or benefits are provided, in accordance with one or more aspects of the present invention:

The fingerprint data need not be stored as a password, but is used in combination with the partial private key to generate the private key.

By maintaining the fingerprint key (e.g., FPKEY) of a user for key generation, multiple pairs of partial private keys and public keys can be generated (e.g., via key generation (KGA)). Whenever a user demands revocation of keys, KGA can be customized by changing the manipulation collection and operations. New partial private keys and public keys can be generated and distributed. This makes the key revocation process effective and easier.

Multiple partial private key and public key pairs can be generated depending on the audience type and requirements. For example, for a vendor that transacts with a European market and an Asian market, instead of sending one public key to both markets, the vendor may prefer sending two different public keys to them. This protects the market strategies of each customer. Thus, the vendor will have two secret partial private keys. However, the vendor's fingerprint data will remain the same. In this example, "n" number of partial private key/public key pairs are generated for the n markets.

The usage of private key is prevented when it is lost.

The partial private key is known to the user, but the FPKEY is not.

When a partial private key and fingerprint combination is used for encryption, a public key is used for decryption.

When a public key is used for encryption, a partial private key and fingerprint combination is used for decryption.

A Digital signature can be generated using a partial private key and fingerprint combination.

This is applicable to any public key cryptography system.

The fingerprints process does not need to be changed whenever the key is lost.

The fingerprint component of the private key is generated on the fly from a fingerprint data capturing device, which can be coupled to the client via interfaces, like USB ports.

The FPKEY used to generate the digital signature is deleted as soon as the digital signature is generated by the encryption process.

The combination of the partial private key and fingerprints to encrypt/decrypt data adds more security in terms of authentication and secrecy.

Although various embodiments are described above, these are only examples. For instance, different types of processing units can use one or more aspects of the present invention. Further, the merging, splitting and combining described during the various processes can be performed in any manner. Yet further, other types of fingerprint capturing devices may be used. Moreover, biometrics other than fingerprints may be used. In such an example, the fingerprint capturing device is replaced by another type of biometric device, such as an optical reader or any other type of device that captures biometric data. The biometric device captures the "impressions" and provides processed biometric data. Commercially available devices are used, in one example, to obtain the biometric data and provide the processed data. The processed data is then used in the key generation, encryption and/or decryption processes, similar to the processed fingerprint data. Many other variations are also possible.

As one example, other types of environments can benefit from one or more aspects of the present invention. For example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

As used herein, the term obtaining includes, but is not limited to, receiving, being provided, having, retrieving, determining, accessing, generating, creating, calculating, etc. Combining includes, but is not limited to, putting the components to be combined together in any selected manner (e.g., intermingling the components as desired; appending the components, as desired; etc.)

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating protection of information in a public key communications environment, said method comprising:
obtaining a partial private key of a user of the public key communications environment, the partial private key generated by performing one or more operations using at least one element of biometric data of the user to obtain the partial private key of the user; and
generating, based on the obtained partial private key, a private key for use by the user in encryption or decryption in the public key communications environment, the generating the private key comprising:
obtaining biometric data of the user, the obtained biometric data comprising a first collection of elements;
combining the first collection of elements of the obtained biometric data of the user with a second collection of elements comprising one or more additional elements to form a combined collection of elements, the one or more additional elements comprising non-biometric data;
generating from the combined collection of elements a subset of elements, the subset of elements comprising one or more elements of the obtained biometric data of the user, from the first collection of elements, and one or more of the additional elements, from the second collection of elements, wherein the subset of elements comprises at least one of the non-biometric data;
performing one or more other operations on the subset of elements, the performing the one or more other operations manipulating the elements of the subset including the one or more elements of the obtained biometric data of the user and the one or more of the additional elements, to generate manipulated biometric data; and
combining the partial private key and the manipulated biometric data to form the private key.

2. The method of claim 1, wherein performing the one or more other operations on the subset of elements to generate the manipulated biometric data comprises defining a plurality of manipulation collections of elements, and manipulating at least one element of the subset of elements based on one or more elements of the plurality of manipulation collections of elements to obtain a resultant collection of data, wherein the resultant collection of data comprises the manipulated biometric data.

3. The method of claim 1, wherein the obtaining of the partial private key comprises:
generating the partial private key;
providing the generated partial private key to the user; and
providing, by the user, the generated partial private key as the partial private key to be used in the combining the partial private key and the manipulated biometric data.

4. The method of claim 1, wherein the manipulated biometric data is included as part of the private key absent a storing of the manipulated biometric data as a password.

5. The method of claim 1, wherein the private key is part of a private key/public key pair, and wherein there is a mathematical link between the private key and the public key of the private key/public key pair.

6. The method of claim 1, further comprising generating a plurality of private key/public key pairs for the user using biometric data of the user, wherein each private key/public key pair is different.

7. The method of claim 6, wherein the generating for a private key/public key pair includes manipulating at least one key of the private key/public key pair to obtain the private key/public key pair, wherein at least one manipulation used for one private key/public key pair is different than manipulations used for another private key/public key pair of the plurality of private key/public key pairs for the user.

8. The method of claim 6, further comprising:
determining that a private key of a private key/public key pair being used by the user has been compromised;
revoking the private key/public key pair; and
providing to the user another private key/public key pair of the plurality of private key/public key pairs.

9. The method of claim 1, further comprising;
encrypting information using the private key to provide encrypted information;
receiving, by a receiver, the encrypted information; and
decrypting, by the receiver, the encrypted information, the decrypting using a public key corresponding to the private key, wherein the public key is generated using manipulated biometric data of the user.

10. The method of claim 1, wherein the biometric data comprises fingerprint data.

11. A system of facilitating protection of information in a public key communications environment, said system comprising:
a memory; and
a processor in communications with the memory, wherein the system is configured to perform a method comprising:

obtaining a partial private key of a user of the public key communications environment, the partial private key generated by performing one or more operations using at least one element of biometric data of the user to obtain the partial private key of the user; and generating, based on the obtained partial private key, a private key for use by the user in encryption or decryption in the public key communications environment, the generating the private key comprising:

obtaining biometric data of the user, the obtained biometric data comprising a first collection of elements;

combining the first collection of elements of the obtained biometric data of the user with a second collection of elements comprising one or more additional elements to form a combined collection of elements, the one or more additional elements comprising non-biometric data;

generating from the combined collection of elements a subset of elements, the subset of elements comprising one or more elements of the obtained biometric data of the user, from the first collection of elements, and one or more of the additional elements, from the second collection of elements, wherein the subset of elements comprises at least one of the non-biometric data;

performing one or more other operations on the subset of elements, the performing the one or more other operations manipulating the elements of the subset including the one or more elements of the obtained biometric data of the user and the one or more of the additional elements, to generate manipulated biometric data; and combining the partial private key and the manipulated biometric data to form the private key.

12. The system of claim 11, wherein the biometric data is fingerprint data, wherein the generated manipulated biometric data is manipulated fingerprint data, and wherein performing the one or more other operations on the subset of elements to generate the manipulated fingerprint data comprises defining a plurality of manipulation collections of elements and manipulating at least one element of the subset of elements based on one or more elements of the plurality of manipulation collections of elements to obtain a resultant collection of data, wherein the resultant collection of data comprises the manipulated fingerprint data.

13. The system of claim 11, wherein the private key is part of a private key/public key pair, and wherein there is a mathematical link between the private key and the public key of the private key/public key pair.

14. The system of claim 11, further comprising generating a plurality of private key/public key pairs for the user using biometric data of the user, wherein each private key/public key pair is different.

15. A computer program product to facilitate protection of information in a public key communications environment, said computer program product comprising:

a non-transitory storage medium readable by a processing circuit and storing instructions for execution by the processing circuit for performing a method comprising:

obtaining a partial private key of a user of the public key communications environment, the partial private key generated by performing one or more operations using at least one element of biometric data of the user to obtain the partial private key of the user; and generating, based on the obtained partial private key, a private key for use by the user in encryption or decryption in the public key communications environment, the generating the private key comprising:

obtaining biometric data of the user, the obtained biometric data comprising a first collection of elements;

combining the first collection of elements of the obtained biometric data of the user with a second collection of elements comprising one or more additional elements to form a combined collection of elements, the one or more additional elements comprising non-biometric data;

generating from the combined collection of elements a subset of elements, the subset of elements comprising one or more elements of the obtained biometric data of the user, from the first collection of elements, and one or more of the additional elements, from the second collection of elements, wherein the subset of elements comprises at least one of the non-biometric data;

performing one or more other operations on the subset of elements, the performing the one or more other operations manipulating the elements of the subset including the one or more elements of the obtained biometric data of the user and the one or more of the additional elements, to generate manipulated biometric data; and combining the partial private key and the manipulated biometric data to form the private key.

16. The computer program product of claim 15, wherein the biometric data is fingerprint data, wherein the generated manipulated biometric data is manipulated fingerprint data, and wherein performing the one or more other operations on the subset of elements to generate the manipulated fingerprint data comprises defining a plurality of manipulation collections of elements, and manipulating at least one element of the subset of elements based on one or more elements of the plurality of manipulation collections of elements to obtain a resultant collection of data, wherein the resultant collection of data comprises the manipulated fingerprint data.

17. The computer program product of claim 15, further comprising generating a plurality of private key/public key pairs for the user using biometric data of the user, wherein each private key/public key pair is different.

18. A method of deploying authentication logic on one or more processing units, said method comprising:

installing authentication logic on at least one processing unit, the authentication logic to:

obtain a partial private key of a user of the public key communications environment, the partial private key generated by performing one or more operations using at least one element of biometric data of the user to obtain the partial private key of the user; and generate, based on the obtained partial private key, a private key for use by the user in encryption or decryption in the public key communications environment, the generating the private key comprising:

obtaining biometric data of the user, the obtained biometric data comprising a first collection of elements;

combining the first collection of elements of the obtained biometric data of the user with a second collection of elements comprising one or more additional elements to form a combined collection of elements, the one or more additional elements comprising non-biometric data;

generating from the combined collection of elements a subset of elements, the subset of elements comprising one or more elements of the obtained biometric data of the user, from the first collection of elements, and one or more of the additional elements, from the second collection of elements, wherein the subset of elements comprises at least one of the non-biometric data;

performing one or more other operations on the subset of elements, the performing the one or more other operations manipulating the elements of the subset including the one or more elements of the obtained biometric data of the user and the one or more of the additional elements, to generate manipulated biometric data; and combining the partial private key and the manipulated biometric data to form the private key.

19. The method of claim 1, wherein the one or more additional elements comprise random numbers, and wherein the subset of elements comprises at least one of the random numbers.

* * * * *